No. 754,377. PATENTED MAR. 8, 1904.
G. W. MacKENZIE.
CHECK CONTROLLED GAME APPARATUS.
APPLICATION FILED OCT. 2, 1902.
NO MODEL. 3 SHEETS—SHEET 1.
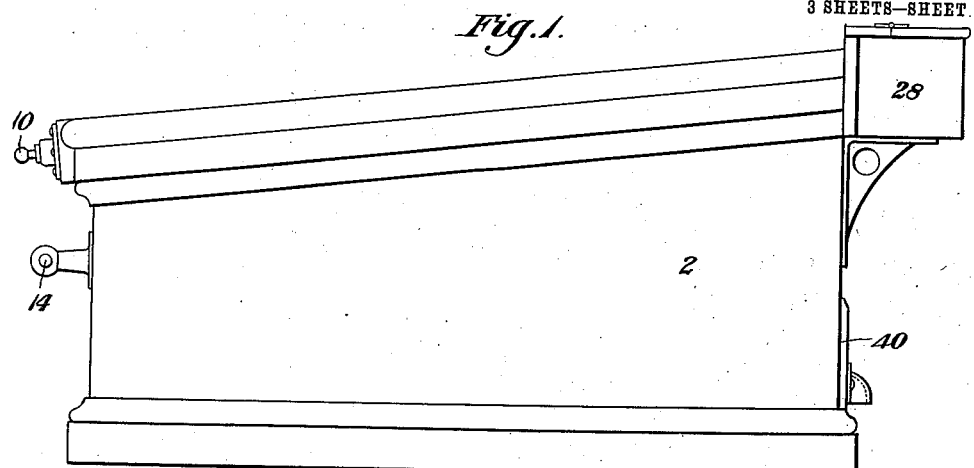
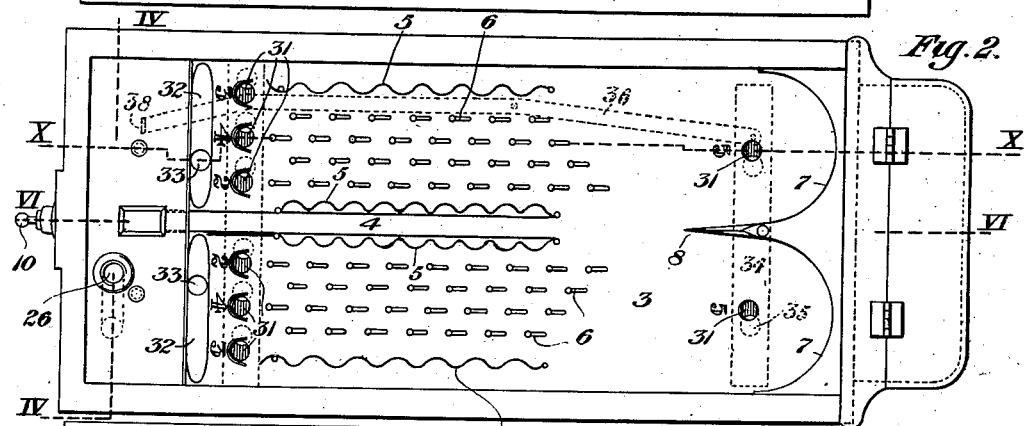

No. 754,377. PATENTED MAR. 8, 1904.
G. W. MacKENZIE.
CHECK CONTROLLED GAME APPARATUS.
APPLICATION FILED OCT. 2, 1902.
NO MODEL. 3 SHEETS—SHEET 2.
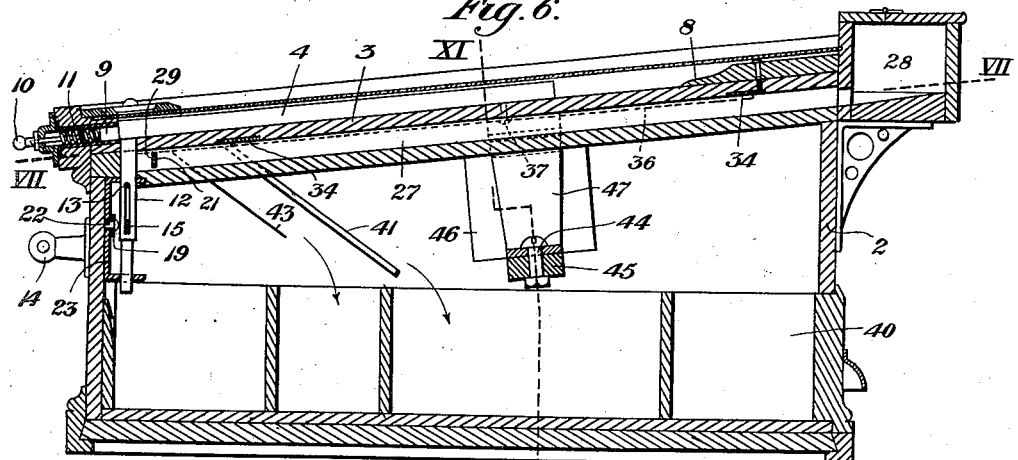
Fig. 6.
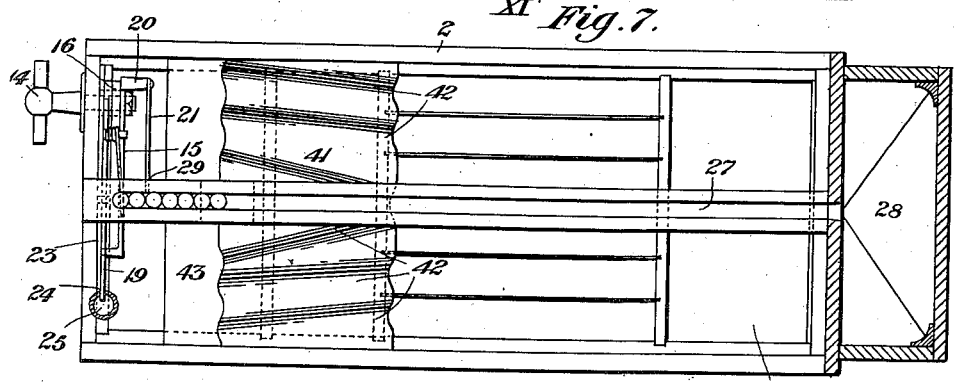
Fig. 7.
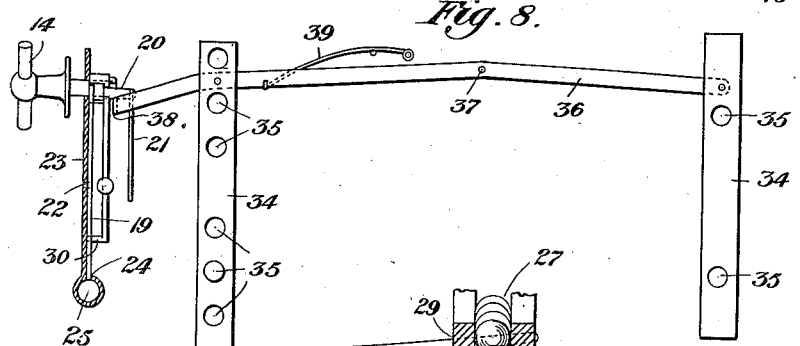
Fig. 8.
Fig. 9.
Witnesses:
E. F. MacKenzie
Chas. S. Lipley
Inventor:
George W. MacKenzie
by C. M. Clarke
his Attorney.

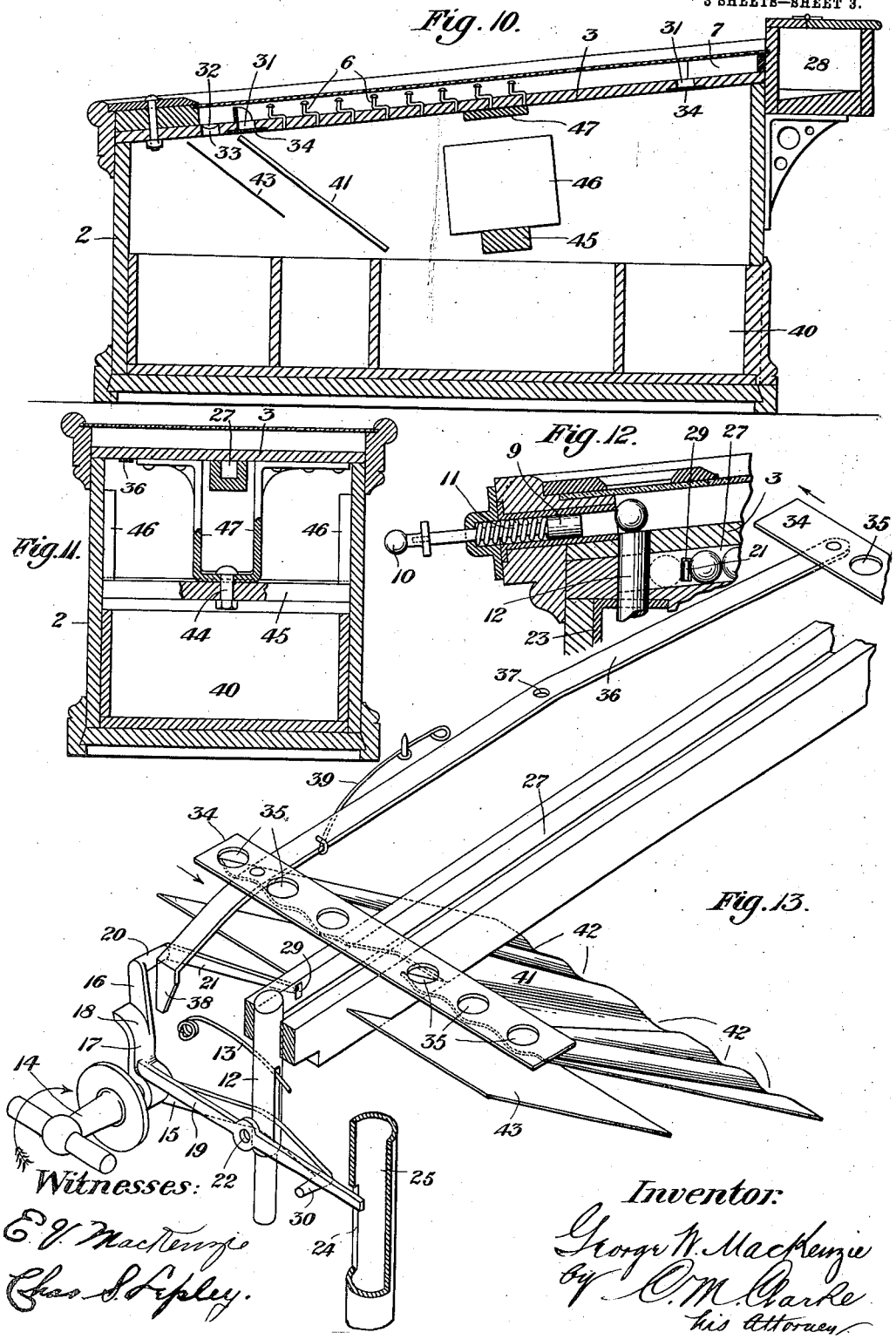

No. 754,377. Patented March 8, 1904.

UNITED STATES PATENT OFFICE.

GEORGE W. MacKENZIE, OF BEAVER, PENNSYLVANIA, ASSIGNOR OF FIVE-SIXTHS TO ROBERT H. MARKS AND R. E. MILLS, OF BEAVER, PENNSYLVANIA, AND ROBERT H. M. MacKENZIE, OF PITTSBURG, PENNSYLVANIA.

CHECK-CONTROLLED GAME APPARATUS.

SPECIFICATION forming part of Letters Patent No. 754,377, dated March 8, 1904.

Application filed October 2, 1902. Serial No. 125,645. (No model.)

*To all whom it may concern:*

Be it known that I, GEORGE W. MACKENZIE, a citizen of the United States, residing at Beaver, in the county of Beaver and State of Pennsylvania, have invented certain new and useful Improvements in Check-Controlled Game Apparatus, of which the following is a specification, reference being had therein to the accompanying drawings, forming part of this specification, in which—

Figure 1 is a view in side elevation of my improved game apparatus. Fig. 2 is a plan view thereof. Fig. 3 is a front end view. Fig. 4 is a vertical cross-sectional view on the line IV IV of Fig. 2. Fig. 5 is a detail view, on an enlarged scale, of the locking mechanism. Fig. 6 is a longitudinal sectional view on the line VI VI of Fig. 2. Fig. 7 is a horizontal sectional view indicated by the line VII VII of Fig. 6. Fig. 8 is a plan view of the operating mechanism and shifting coverplates. Fig. 9 is a detail view similer to Fig. 5, showing the plunger in a depressed position. Fig. 10 is a logitudinal sectional view on the line X X of Fig. 2. Fig. 11 is a cross-sectional view on the line XI XI of Fig. 6. Fig. 12 is a partial sectional detail view, on an enlarged scale, of the front upper portion of the apparatus, showing the shooter withdrawn, a ball having been raised in front of it by the plunger. Fig. 13 is a perspective detail view of the operative mechanism of the apparatus assembled.

My invention refers to a game apparatus wherein balls are adapted to be operated by a spring-controlled shooter or projector; and it relates more particularly to the mechanism for locking and unlocking the operating elements of the device. Similar subject-matter is embodied in another copending application for game apparatus filed April 24, 1903, Serial No. 154,113.

The operation of the mechanism is controlled by the gravitating action of a suitable tally-weight—as, for instance, one of the said balls, a disk, or other suitable device of a uniform size and weight—thereby releasing locking mechanism and permitting the operator to throw a ball into range of a plunger, in the meantime cutting off the supply so as to admit but one ball for each operation, the ball then being raised by the plunger into the path of an operating-shooter, by which it is projected through the alley and upon the table-top, which is preferably inclined, after which it rolls by gravity until finally pocketed.

Referring to the drawings, 2 is the case of the apparatus, in the upper portion of which is an inclined top or table 3, in the central lower portion of which is arranged for a portion of the length of the top an alley or channel 4. On each side of said alley at the sides of the table are provided corrugated abutments or obstructions 5, while a portion of the intervening surface of the table is covered with upwardly-projecting obstructions in the form of pins 6, which are preferably arranged with a bent portion extending upwardly along the table-surface, the pin then being inserted through the table, as clearly shown in Fig. 10. The object of such arrangement is that the balls are thereby prevented from lodging against the pin and will roll off to one side or the other, as will be readily understood. These pins and the corrugated abutments 5 are designed to interfere with the downward travel of the ball and to deflect it in various directions, so as to render its path of movement uncertain. At the upper portion of the top 3 are located concave fenders 7, terminating in a central downwardly-extending point 8, substantially in alinement with the alley 4, and adapted to deflect the ball to one side or the other. At the lower end of the alley and in alinement therewith is located a shooter or plunger 9, mounted in suitable bearings, terminating in an outer button 10 and provided with a spring 11, adapted to throw the plunger forwardly to project the ball when the plunger is withdrawn, as shown in Fig. 12, and then released. Immediately in advance of the shooter is a vertically-arranged plunger 12, mounted in suitable guiding devices and normally held upwardly by a spring 13, engaging the plunger through a slot or in any other suitable manner.

14 is an operating-handle extending outwardly through the front of the case, on the inner end of which is mounted a lever 15, passing through the plunger 12 or engaging it in any other suitable manner, so that when the handle is partially rotated the lever 15 will withdraw the plunger downwardly, permitting one ball to roll upon it, as in Fig. 9. The turning-handle 14 is also provided with an upwardly-extending lever 16, having a vertical locking-face 17, terminating in a curved cam portion 18, adapted to be locked by and to engage and lift one end of the locking-bar 19. The lever 16 terminates in a forwardly-extending stud 20, to the outer end of which is pivoted a cut-off bar 21. The locking-lever 19 is pivoted at 22 to a plate 23 or other suitable bearing on the inner side of the case, the other end of the locking-bar extending through a slot 24 into the path of gravity-operated tally-weight, which passes downwardly through a guiding-channel 25. Such guiding-channel is deflected at its upper portion and terminates in the upper face of the apparatus in an offset-opening 26, as clearly shown in Fig. 4, the deflection in the channel preventing the insertion of a wire or other instrument for the purpose of depressing the locking-bar. If it is desired to actuate the unlocking device by a check or coin, the channel 25 may be made of suitable cross-sectional slot form, as is usual in check or coin controlled apparatus.

Centrally arranged beneath the table 3 is a longitudinally-inclined channel 27, through the lower end of which the plunger operates, said channel terminating at its upper portion in a reservoir box or holder 28, provided with a hinged cover or other means of access to the interior.

The cut-off bar 21 projects through an opening 29 in the side of the channel 27 and is adapted to be thrown in, so as to cut off all the balls, except the one immediately above the plunger 12, simultaneously with the downward travel of said plunger, thereby permitting but one ball to roll down at each operation.

The plunger-lever 15 terminates at its outer end in a projection or stud 30, which in the normal position of the apparatus is somewhat below the outer portion of the locking-lever 19, the inner end of which lever is somewhat heavier than the outer end, so as to normally hold the outer end upwardly in slot 24 and into the path of the downwardly-falling tally-weight. The stud 30 arrests such downward travel of the locking-lever when the inner end has been raised sufficiently far to unlock lever 16 by rising above the vertical portion 17, as clearly shown in Fig. 5, whereupon the turning stem 14 may be operated, lowering the lever 15, plunger 12, and stud 30, bringing the cam-face 18 against the end of the locking-lever and tilting it upwardly on its pivot, permitting the tally-weight to fall, as clearly shown in Fig. 9, and at the same time thrusting in the cut-off bar 21, permitting a single ball to roll down onto the top of the plunger. Upon releasing the turning-handle the spring 13 will raise the plunger, throwing the ball upwardly in front of the shooter, as shown in Fig. 12.

At various locations upon the table 3 are holes 31, extending through the table, which holes may be designated by numbers of varying denomination, so as to attribute counting values to the holes in which the balls are adapted to lodge, so that a count or score may be kept by the players. Some or all of the holes 31 may be provided at their lower sides with upwardly-extending walls or fenders adapted to prevent the balls from rolling over the holes. At the lowermost end of the top 3 are transverse grooves or gutters 32, from which openings 33 lead downwardly through the table, which openings are adapted to receive such balls as have not lodged in any of the upper cavities and which are counted as blanks.

Underneath the openings 31 are slidingly-arranged cover plates or grates 34, provided with openings 35, adapted to register with the openings 31 when the cover-plates are shifted, but which normally close the openings, as shown in Fig. 2. At each operation the cover-plates are shifted, so as to permit any ball in any of the openings 31 to fall, by means of a lever 36, pivoted between the cover-plates at 37, so as to shift them in opposite directions, the lever having a forward extension provided with a downwardly-turned lug 38, extending into the path of the stud 20. By this construction it will be seen that at each operation of the machine the cover-plates will be shifted to drop the ball, and a spring 39, secured to the under side of the table, is adapted to retract the lever 36 to again cover the apertures 31 when the mechanism is reversed.

40 is a drawer provided with partitions and spaces to receive the balls from each individual hole, and for the purpose of guiding the balls passing through the holes and the openings of the cover-plates I have provided a slanting guiding plate or chute 41, having grooves or gutters 42, corresponding to each particular hole and adapted to deliver the ball into its particular space in the drawer. A similar plate 43 delivers the "blank" balls to their particular department in the drawer, while the tally-balls drop downwardly through channel 25 into a separate compartment in the drawer adapted to receive them. The drawer is preferably provided with a lock, and the top or cover is clamped down from the interior by means of a bolt 44, passing through the cross-bar 45, engaging cleats 46 on the inner side of the case, the bolt passing through a bracket 47, secured to the under side of the table 3.

A quantity of balls having been placed in the reservoir-box 28, they will roll downwardly through the central channel 27, and upon dropping the tally-ball into the channel 25 a handle 14 is operated, releasing the lowermost ball, which is then thrust upwardly in front of the shooter, by which it is projected upwardly through channel 27 and out upon the surface table 3, after which it will either settle into one of the upper holes 31 or will roll by gravity downwardly upon the table-top at random, falling either into one of the lower holes 31 or by one of the gutters 32 will be directed into one of the blank holes 33. The ball, if in one of the holes 31, will rest there in full view until dropped by the shifting of the under cover-plate 34 at the commencement of the next operation.

It will be understood that the reservoir 28 is adapted to hold a large number of balls, which will continuously roll down through the channel 37 until exhausted, and the tally-balls may be also taken from the reservoir to supply the players or from a different source of supply, as may be desired.

It will be understood that various adaptations, changes, or modifications may be made—as, for instance, the number and location of the openings, passages, obstructions, &c.—and I do not desire to be confined to the exact construction nor arrangement of these elements as shown and described, nor to the form of case or other details, inasmuch as these may be varied by the skilled mechanic or according to the different adaptations of the opertative elements of the invention, and all such are to be considered as within the scope of the following claims.

What I claim is—

1. In a game apparatus, the combination with a pivotal turning stem and handle having a lever-arm provided with a locking-bearing and a cam-face, and a plunger-actuating lever provided with a limiting-abutment; of a pivoted locking-lever adapted to engage said locking-bearing, and to be actuated by a tally-weight and to be partially depressed by the tally-weight to engage the limiting-abutment and to be further depressed by the cam-face, substantially as set forth.

2. In a game apparatus, the combination with a pivotal turning stem and handle having a lever-arm provided with a locking-bearing and a cam-face, and a plunger-actuating lever provided with a limiting-abutment; of a tally-weight channel and a pivoted locking-lever projecting thereinto and adapted to engage said locking-bearing, limiting-abutment and cam-face in the order named, substantially as set forth.

In testimony whereof I affix my signature in presence of two witnesses.

GEORGE W. MACKENZIE.

Witnesses:
JAS. J. MCAFEE,
C. M. CLARKE.